United States Patent [19]

Browne

[11] Patent Number: 4,647,211
[45] Date of Patent: Mar. 3, 1987

[54] APPARATUS FOR MEASURING REFLECTIVITY WHICH IS TOLERANT OF BACKGROUND AND PRODUCT TRAJECTORY VARIATIONS

[75] Inventor: Edward M. Browne, Houston, Tex.

[73] Assignee: ESM International, Inc., Houston, Tex.

[21] Appl. No.: 722,664

[22] Filed: Apr. 12, 1985

[51] Int. Cl.⁴ .......................................... G01N 21/55
[52] U.S. Cl. ................................................... 356/447
[58] Field of Search ................. 356/445, 446, 447, 448

[56] References Cited

U.S. PATENT DOCUMENTS

| | | | |
|---|---|---|---|
| 4,037,970 | 7/1977 | Webster et al. | 356/446 X |
| 4,235,342 | 11/1980 | Braham | 250/226 X |
| 4,262,806 | 4/1981 | Drabs | 250/223 R X |
| 4,280,625 | 7/1981 | Grobbeloar et al. | 356/341 X |
| 4,344,539 | 8/1982 | Lockett | 250/226 X |

FOREIGN PATENT DOCUMENTS 0146299  6/1985  European Pat. Off. .
2091416  7/1982  United Kingdom .

Primary Examiner—Eugene R. LaRoche
Assistant Examiner—James C. Lee
Attorney, Agent, or Firm—Vaden, Eickenroht, Thompson & Boulware

[57] ABSTRACT

An apparatus for measuring the reflectivity of a product for use in optical sorting machines that is tolerant of background and product trajectory variations. The apparatus computes the percent of the viewing frame filled by the product at any instant as well as the reflectivity of the background when no product is present. The reflectivity at selected wavelengths from selected perspectives is computed for a product as the product passes a viewing frame by correcting for frame fill and background factors. Given an estimate of product velocity, product size may also be estimated.

10 Claims, 9 Drawing Figures

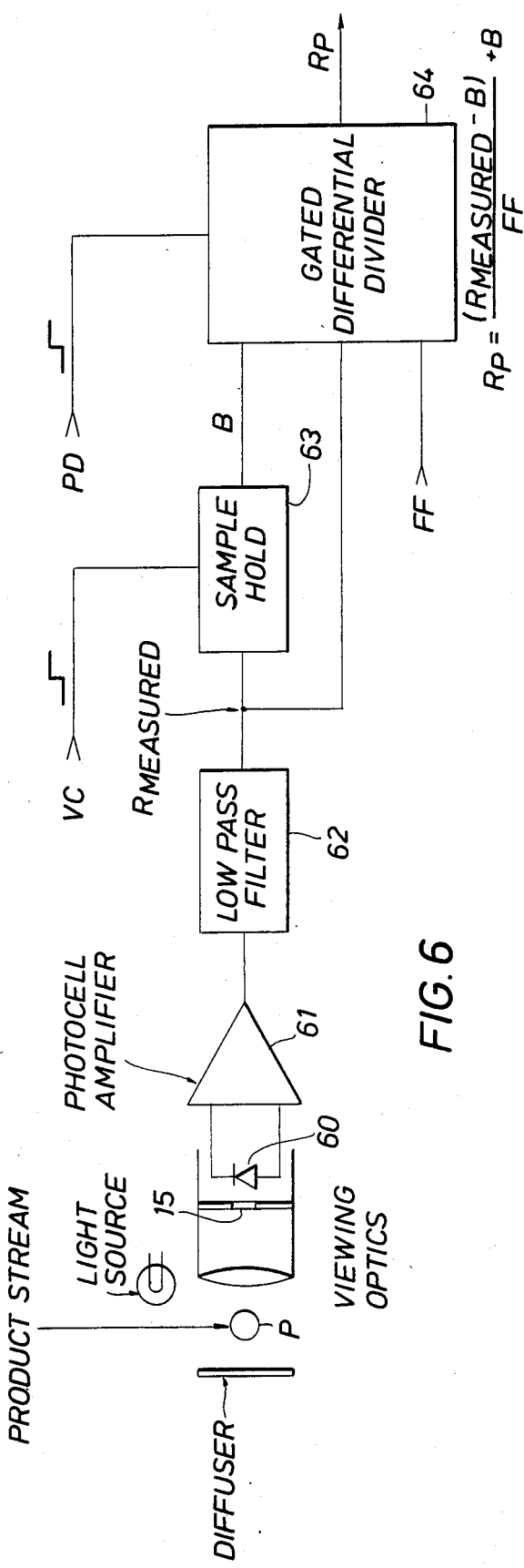
FIG.6
FIG.7
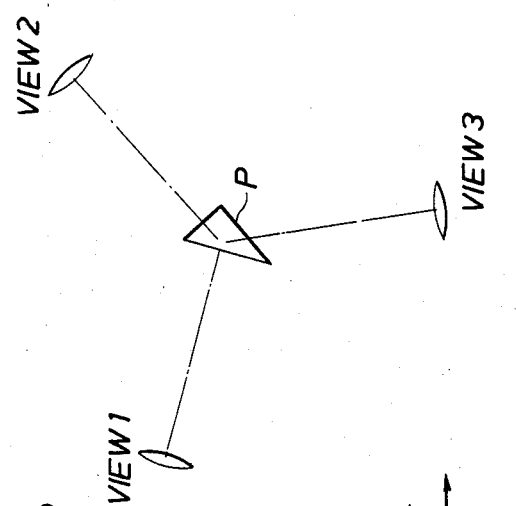
FIG.8

APPARATUS FOR MEASURING REFLECTIVITY WHICH IS TOLERANT OF BACKGROUND AND PRODUCT TRAJECTORY VARIATIONS

FIELD OF THE INVENTION

This invention relates to sorting machines that sort based on product reflectivity. This invention relates more particularly to the apparatus for measuring the reflectivity of the product.

BACKGROUND OF THE INVENTION

Present sorting machines utilize one of two alternative schemes for determining a product's reflectivity, (either multichromatic or monochromatic). On the one hand an apparatus may attempt to measure only the light that is reflected from the product. Alternately, an apparatus may intentionally measure both the light reflected from the product and the light reflected from the background and then attempt to differentiate between the two.

The first scheme, attempting to measure only the light reflected from the product, is the more difficult of the two alternatives. Succeeding products in a product stream do not follow identical paths. Hence a viewing window may frame a view of a part of the product and a part of the background. Correcting this situation by making the viewing window small in relation to product size results in placing a limitation on the total surface of the product viewable. It might result in missing the product altogether due to variance in the product stream trajectory.

In the second scheme, a viewing window, or frame, is intentionally chosen that is wider than the product so that all (at least from one perspective) of the product will be viewed through one frame in successive instances. Each framed view of the product necessarily contains some view of the background. Typically a background is selected with the same reflectivity as the average good product. Any reflectivity measurement differing substantially from the acceptable background reflectivity is taken as an indication of an unacceptable product.

This second technique has limitations. Since products of different size fill the viewing frame to different degrees, products with equally unacceptable reflectivity characteristics will generate different measurements. The machine cannot discriminate between different sized products. Moreover, views of the same uniformly colored product from different perspectives will generate different estimates of product reflectivity if the product is of a shape to present different amounts of viewing area in different directions.

It is advantageous to be able to sort products based on their overall reflectivity, independent of their size and particular trajectory. It is also desirable to sort a wide variety of products without changing backgrounds. It is also desirable to estimate product size.

It is a feature of the present invention to provide for sorting in an improved manner based on both product reflectivity and frame fill information. The frame fill and the reflectivity are measured as the product passes a viewing frame, or frames, by an apparatus that is tolerant of product trajectory variations and viewing station background variations.

SUMMARY OF THE INVENTION

As used in the specification, "light" refers to any electromagnetic radiation. "Frame fill" refers to the fraction of a viewing frame that a product fills in any one instant. The invention disclosed herein measures and calculates the frame fill and the monochromatic or multichromatic reflectivity of a product as it passes a viewing frame, or frames, in a viewing station prior to being sorted. The invention utilizes a source of modulated light and a means for detecting the modulated light that passes through the viewing frame, which means generates in turn a corresponding modulated electrical signal. The modulated light is so directed that a product passing in front of the frame causes a change in the detected modulated light passing through the frame, (causing in turn a change in the corresponding modulated electrical signal). The changes in the corresponding modulated electrical signal form the basis for the calculation of the fraction of the frame filled by the product at a given instant (frame fill). Light passing through the viewing frame at various preselected wavelengths is also detected, both when the product passes the frame and when no product is present. A corresponding electrical signal is generated. The source of the light may be the same as the modulated light source or may be different. The electrical signal generated may be the same as the modulated electrical signal or may be different. The light of the preselected wavelengths must be so directed that it is capable of reflecting off a product passing the viewing frame. Based on changes in the electrical signal and the frame fill calculation the product's monochromatic or multichromatic reflectivity is calculated (from the perspective presented to that frame). Use of multiple frames yields a total view of the product.

BRIEF DESCRIPTION OF THE DRAWINGS

So that the manner in which the above-recited features, advantages, and objects of the invention, as well as others which will become apparent, are attained and can be understood in detail, more particular description of the invention briefly summarized above may be had by reference to the embodiment thereof which is illustrated in the drawings, which drawings form a part of the specification. It is to be noted, however, that the appended drawings illustrate only a typical embodiment of the invention and are therefore not to be considered limiting of its scope as the invention may admit to other equally effective embodiments.

FIG. 6 is a schematic diagram of the reflectivity calculation.

FIG. 7 illustrates the output over time of product reflectivity as successive products pass the viewing window.

FIG. 8 illustrates the view of an irregularly shaped product from three perspectives.

DESCRIPTION OF THE PREFERRED EMBODIMENT

Figure 1A:
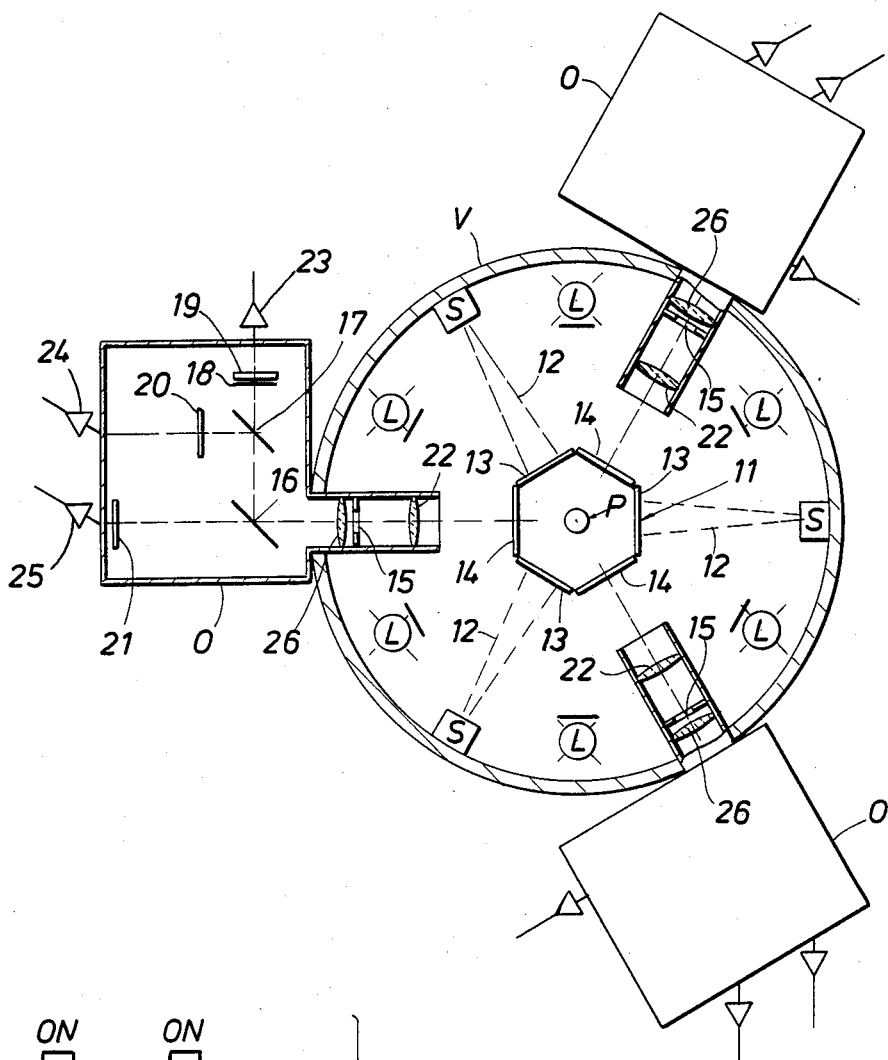
FIG. 1A shows a horizontal cross-sectional view of a viewing station through which a product passes and the associated optics.

FIG. 1A illustrates a horizontal cross section of a viewing station V. Product P falls in a direction into the paper through light box 11 in the center of the station. In the illustrated preferred embodiment there are three optical systems viewing the product, spaced approximately 120° about a horizontal plane orthogonal to the product stream trajectory. For reflectivity measurement purposes sources of light L embracing the wavelengths about which reflectivity information is desired uniformly illuminate the product while in the light box. Ideally the interior of the viewing station would approximate an integrating sphere to evenly distribute light from sources L. In the embodiment shown, there are six sources L; however, this is a representative member only. Also, in the embodiment illustrated, three additional sources of modulated light S are situated each directly opposite the light box and an optical system. S could be, and is taken to be in the preferred embodiment, a light-emitting diode (LED) in the infrared range of the spectrum.

Figure 1B:
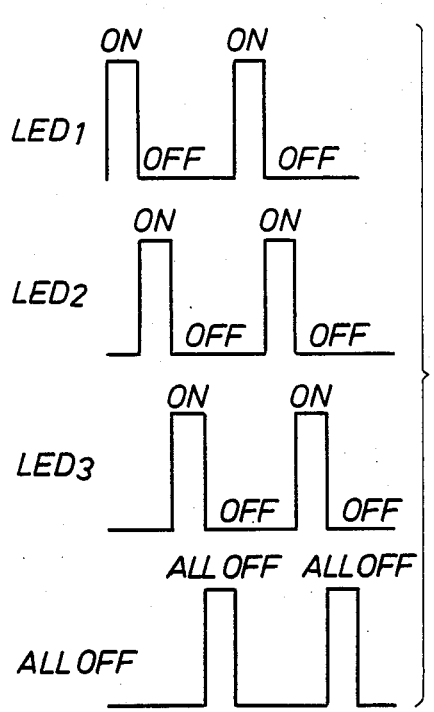
FIG. 1B illustrates a time multiplexing scheme for a three-view sorting machine.

The modulation of the light source is created by pulsing the LED at a frequency above the response required for sorting products. In the preferred embodiment, where more than one optical system is utilized, the sources of modulated light are time multiplexed. Each source of modulated light is pulsed on and off in series such that no two sources are on at the same time. All three systems remain off at the same time so that off-time samples can occur simultaneously. FIG. 1B illustrates the time multiplexing scheme for a three view sorting machine of the preferred embodiment.

Figure 2:
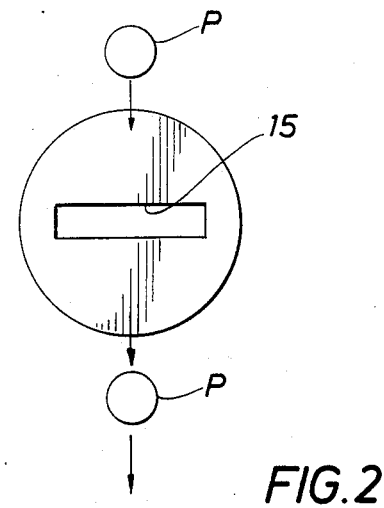
FIG. 2 is a front view of the viewing window or frame.

Between light source S and the optics is diffuser 13 functioning as one side of the light box. Diffuser 13 insures that the modulated light from source S uniformly illuminates viewing window, or frame, 15. Side 14 of the light box is clear. FIG. 2 illustrates a front view of viewing window, or frame, 15.

Since the three optical systems would be identical, only one optical system need be described. Direct and reflected light is focused through lens 22, onto frame 15, through lens 26 and onto beam splitting and filtering mirror 16. Mirror 16 permits light of a preselected wavelength to pass through and reflects the remainder of the light to mirror 17. Mirror 17 reflects light of a preselected wavelength and permits the remainder of the light to pass through onto filter 18.

Although in the embodiment illustrated a wavelength is chosen for the modulated light that lies outside the wavelength used for measuring reflectivity, and although separate sources that are separately placed are used for the modulated light and for the light for measuring reflectivity, this use of separate sources, separate placement and different wavelengths is not necessary to the invention. The modulated light may, in fact, be of the same wavelength and from the same sources that furnish the light for measuring reflectivity and may originate at various locations in the viewing station, as long as the product causes a predictable change in the detected modulated light as the product passes the viewing frame and as long as the modulation process itself, to the extent that it changes the reflectivity of the product, does so to a known degree. Although the preferred embodiment utilizes a viewing station which captures ambient light, such a semi-enclosed viewing station is also not necessary to the invention.

Assuming that mirror 16 reflects all light but passes through light of the wavelength of modulated light source S, such modulated light impinges on transducer 21, which in the preferred embodiment is a photocell. Photocell 21 converts the light into an electrical signal which is amplified by pre-amplifier 25.

Figure 3:
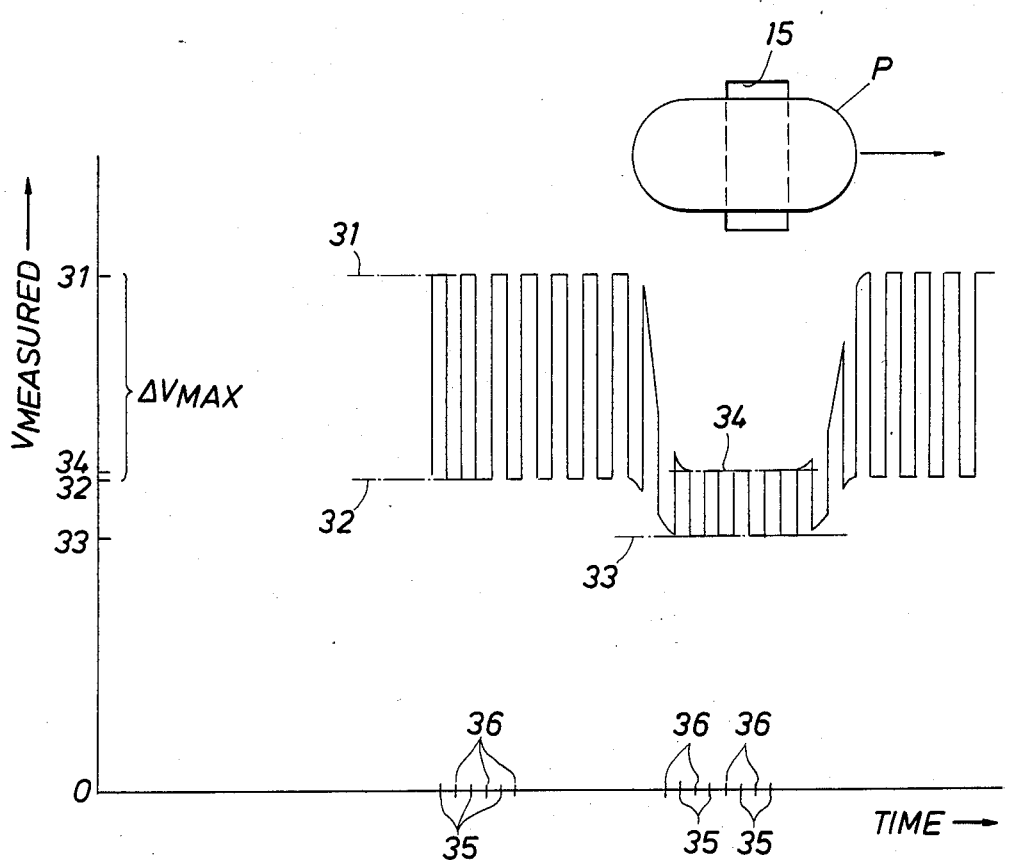
FIG. 3 illustrates the voltage output over time from a frame fill photocell amplifier as a product passes the viewing window thereby partially filling the viewing window.
Figure 4:
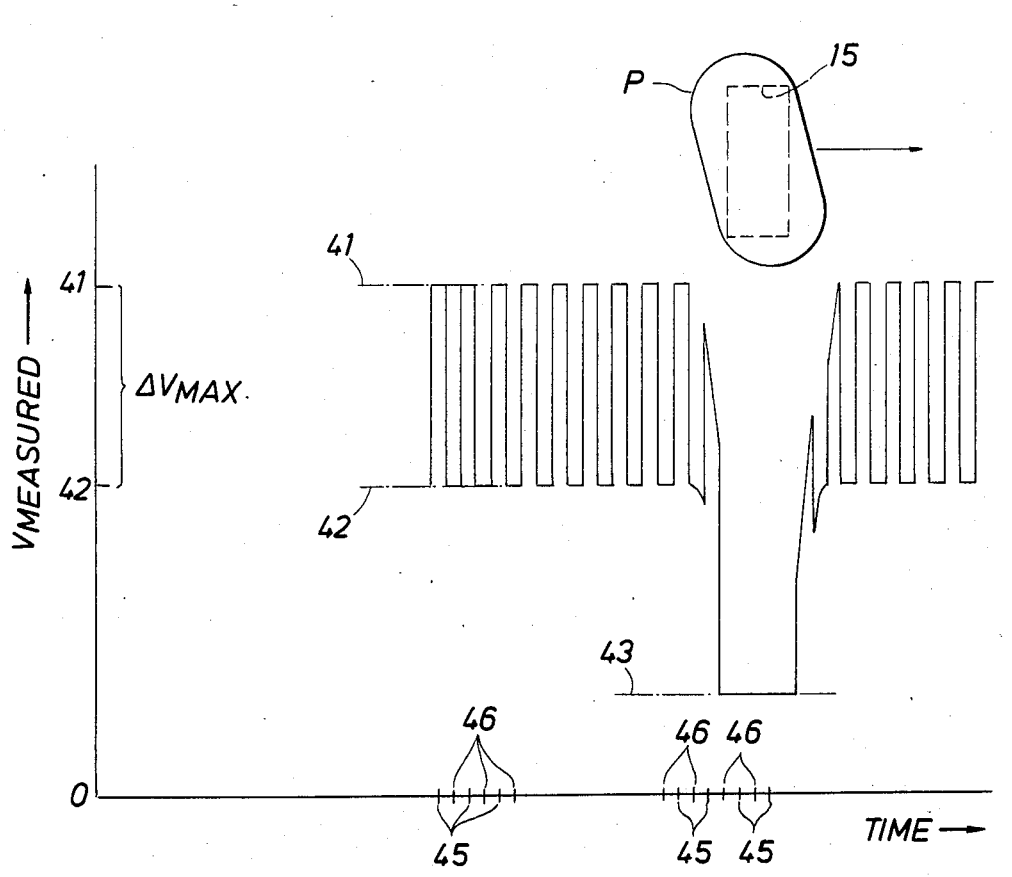
FIG. 4 illustrates the output over time from a frame fill photocell amplifier as a product passes the viewing window and at one point completely fills the viewing window.

FIGS. 3 and 4 illustrate the output of pre-amplifier 25 amplifying the signal from photocell 21, which photocell reacts to light of the wavelength of modulated source S. This pre-amplifier may be called the frame fill photocell amplifier. FIGS. 3 and 4 illustrate the output of the frame fill photocell amplifier over time as a product passes the viewing frame, filling the frame either partially, as illustrated in FIG. 3, or totally, as illustrated in FIG. 4. It can be seen that the invention anticipates and takes into account the presence of ambient light of the same wavelength as that of the modulated source.

It may be noted that whereas in FIG. 1A, the product was shown moving past the viewing frame in a vertical direction, in FIGS. 3 and 4 the product is shown moving past the viewing frame in a horizontal direction. This change in direction in FIGS. 3 and 4 is for visual ease in coordinating the product's movement by the frame with the corresponding figures.

Further, the modulation frequency in FIGS. 3 and 4 is clearly much too slow, but again, it was chosen for visual ease and clarity. It is understood that the modulation frequency in the invention will ordinarily be at a much higher frequency relative to the size of the product. It is also understood that an LED multiplexing scheme such as shown in FIG. 1B or some similar embodiment would normally be implemented in a multiview system, but these have been omitted for clarity.

The modulated light source is modulated by being pulsed on and off. In FIG. 3 when no product is in front of the viewing frame, line 31 shows the voltage output of the frame fill photocell amplifier when the LED is pulsed on, and line 32 shows the output of the frame fill photocell amplifier when the LED is pulsed off. Line 32 is not expected to be zero. Line 32 is the measure of the ambient light in the viewing station of the same wavelength as that of the modulated source. The maximum difference between line 31 and line 32 over time will be $\Delta V_{max}$, a quantity calculated and utilized later.

As product P passes in front of viewing frame 15, obscuring part of the viewing frame, the output of the frame fill photocell amplifier, when the LED is pulsed on, drops to line 34. This drop reflects the placement of the LED with respect to the product and the frame. The product blocks light from the LED from entering the frame but does not reflect light from the LED into the frame. Were the LED placed otherwise with respect to the product and the frame, line 34 could be higher, even higher than line 31. The latter would illustrate that the product could reflect more light from the LED source than it blocks.

In the preferred embodiment, line 34 reflects the amount of light of the wavelength of the modulated light still passing through portions of the viewing frame, both from source S as well as from ambient sources.

From the positioning of the modulated light source, the presumption can be made that no light from the pulsed source is reflected by the product through the frame. If other configurations of the source of modulated light and the frame are utilized such that this presumption is incorrect, then the amount of detected light attributable to the light from the modulated source being reflecting from the product through the frame must be predictable. The detected light from ambient sources may be due to light passing around the product into the frame as well as from light reflected by the product into the frame.

Line 33 illustrates the output of the frame fill photocell amplifier when product P obscures part of the viewing frame and the modulated light source is pulsed off. Again, line 33 illustrates the amount of ambient light of the modulated wavelength passing through the viewing frame both past the product and reflected off the product.

Note that if the amount of ambient light of the same wavelength as the modulating source, when reflected from the product, is greater than the ambient light with no product in view, then both lines 33 and 34 will be increased relative to line 32. The difference between line 33 and line 34 will remain constant however.

In FIG. 4 the product is shown for a short period of time completely filling viewing frame 15. Line 43 illustrates the output of the frame fill photocell amplifier in the preferred embodiment when product P completely fills viewing frame 15. Line 43 is not anticipated to be, or required to be, zero. The value of line 43 is due to the ambient light of the modulated light source frequency which reflects from product P through viewing frame 15. Although line 43 is not zero, the difference between the output of frame fill photocell amplifier 25 when the modulated light source is pulsed on and off in the preferred embodiment, is shown to be essentially zero. This is again a function of the fact that the location of the source of modulated light in the preferred embodiment is shown to yield no reflectance of the light from the modulated source by the product into the frame.

Points 35 and 45 on the time scale of FIGS. 3 and 4 reflect times, as controlled by the timing and control network, when the modulated light source is pulsed on and the value of the output from the frame fill photocell amplifier is sampled. Such values are held in a first sample and store network. Points 36 and 46 illustrate times, as controlled by the timing and control network, when the modulated light source is pulsed off and the value of the output from the frame fill photocell amplifier is sampled. Such values are held in a second sample and store network. Each sample and store network samples once during each pulse on and pulse off of the modulated light source. The difference in the values held in the two sample and store networks is a measure of the difference in the voltage of the modulated electrical signal caused by pulsing the modulated light source off and on while the product remains relatively stationary. That difference in voltage will change over time, depending upon how much of the product is obscuring the viewing frame.

With the modulated light source located opposite the viewing frame, as in the preferred embodiment, evenly illuminating the viewing frame, and with the product passing directly between the modulated light source and the viewing frame, the ratio of (1) the difference in voltage measured when a product is present, $\Delta V_{measured}$, and (2) the maximum difference in voltage measured when no product is present, $\Delta V_{max}$, equals the percent of the frame not filled. In other words, if there is very little difference between the two differences in voltage, there will be very little of the product present in front of the viewing frame. Frame fill, the amount of the frame filled by the product, can thus be calculated by the formula:

$$FF = \frac{\Delta V_{max} - \Delta V_{measured}}{\Delta V_{max}}$$

where

FF is frame fill, the portion of the frame filled by the product in a given instant;

$\Delta V_{measured}$ is the latest measured difference in the voltage outputs of the frame fill photocell amplifier when the modulated light source was pulsed off and on, and $\Delta V_{max}$ is the maximum difference that has been measured between the voltage outputs of the frame fill photocell amplifier when the modulated light source was pulsed off and on, thereby reflecting the difference in voltage when no product is present.

In the preferred embodiment, FF is a normalized value. By normalizing the FF value no specific precalibrated values of $\Delta V_{max}$ and $\Delta V_{measured}$ must be established. Scale factor SF is an arbitrary number which can be used to expand the FF range from 0 volts to 1 volt or from 0 volts to 10 volts, for instance.

It might be noted that since frame fill is calculated upon the basis of differential voltage, any constant bias in the frame fill photocell amplifier will be cancelled in the calculations.

Figure 5:
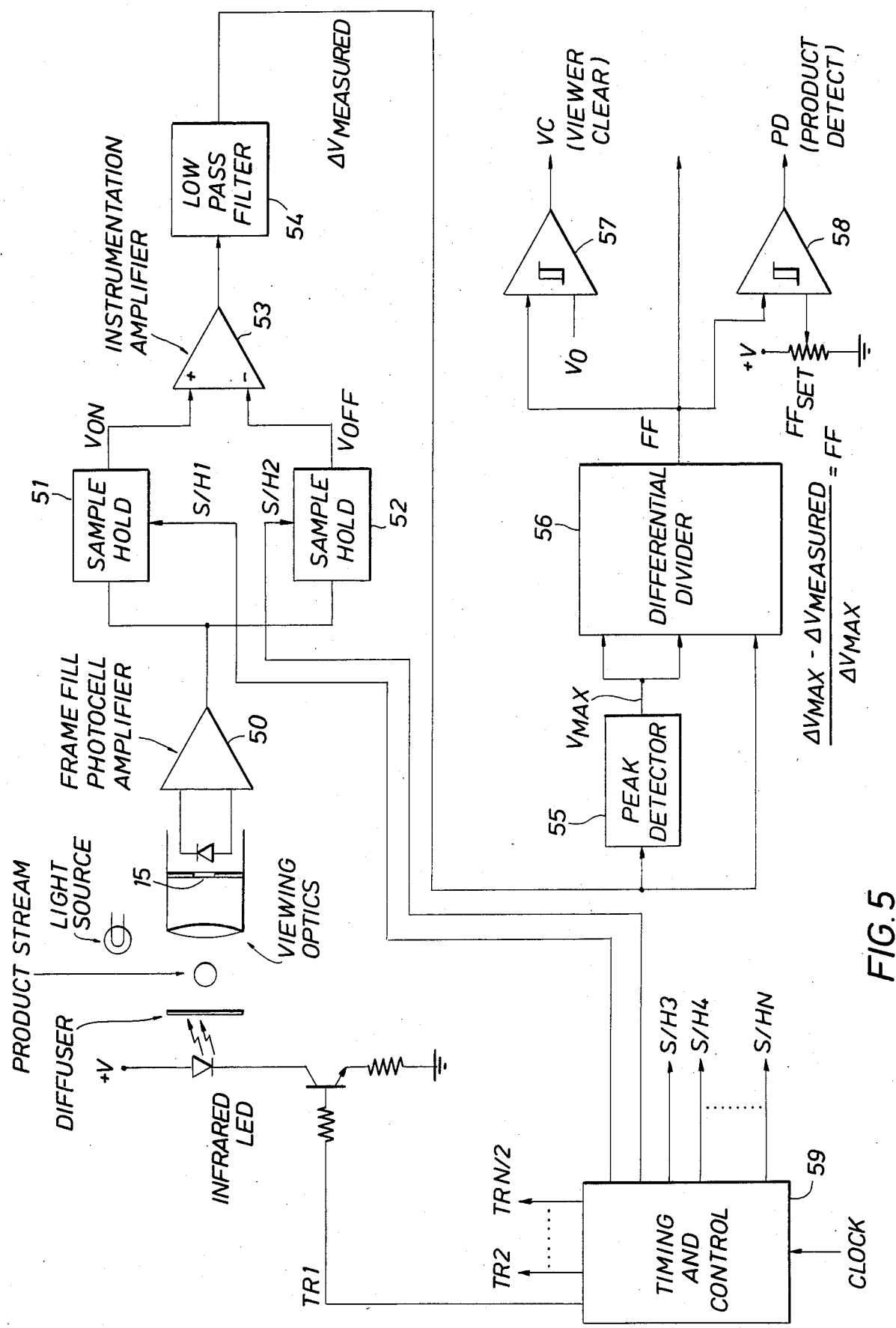
FIG. 5 is a schematic diagram of the frame-fill calculation.

FIG. 5 illustrates the schematics of the calculation of frame fill signal, FF, product detect signal, PD, and viewing clear signal, VC, in the preferred embodiment. In FIG. 5 timing and control system 59 pulses the infrared LED on and off. Pulses of infrared light pass through the diffuser, through viewing frame 15 and onto the infrared photocell where an electrical signal is generated. The electrical signal is amplified by the frame fill photocell amplifier and passes to two sample and hold networks. The timing and control network enables first sample and hold network 51 to sample and hold a value presented from the frame fill photocell amplifier when the infrared LED has been pulsed on. The timing and control network enables second sample and hold network 52 to sample and hold the value from the frame fill photocell amplifier during the succeeding pulse period when the infrared LED has been pulsed off. Instrumentation amplifier 53 differences the values held in the two sample and hold networks and generates $\Delta V_{measured}$. After passing through low pass filter 54, $\Delta V_{measured}$ is presented both to peak detector 55 and differential divider 56. Peak detector 55 stores the value of the maximum $\Delta V_{measured}$. This value is referred to as $\Delta V_{max}$. $\Delta V_{max}$ is presented to differential divider 56. The differential divider performs the requisite calculation and generates the frame fill signal, FF.

"FF set" represents a value selected by the operator of the apparatus. When the calculated frame fill, FF, is greater than FF set, as determined by amplifier 58, product detect signal PD is generated. The generation of product detect signal PD indicates that a sufficient portion of the frame is filled by a product to make a reliable reflectivity calculation.

$V_0$ is a preselected value higher than the noise in the system and lower than $FF_{set}$. When frame fill, FF, is lower than $V_0$, as determined by amplifier 57, viewer clear signal VC is generated. The generation of viewer clear signal VC indicates that essentially no product is in front of the viewing frame.

It can be seen from the above that if the viewing frame has a breadth greater than the maximum breadth of the anticipated products the size of the product passing the viewing frame could be estimated. By assuming or by measuring product velocity, using any known method, and by coordinating that velocity with the frame-fill calculation over time, the total area presented by a product to a viewing frame can be calculated. Such area calculations from one or more viewers can yield an estimate of total product size. Deviations from an acceptable average product size could be detected and products sorted upon that basis.

FIG. 6 illustrates the preferred manner of computing the reflectivity of the product, $R_P$. Light source L illuminates a product stream as it passes the viewing optics. Reflected light from the product and other background light passes through the viewing frame, is filtered for predetermined wavelengths (as illustrated by mirror 17 and filter 18 of FIG. 1) and impinges on transducer 60, a photocell in the preferred embodiment.

If light of the same wavelength is used both for the modulated light to calculate frame fill and for the light to calculate reflectivity, only one pre-amplifier is required. This pre-amplifier would have a sufficiently wide bandwidth to detect both modulation and reflection information. It is possible to use the same photocell and pre-amplifier for both frame fill and reflectance information because it is the change in the differential voltage that is indicative of frame fill whereas the change in absolute voltage, i.e., the envelope of the modulated electrical signal, is indicative of the reflectivity information.

In the preferred embodiment, the output from photocell 60 is amplified by photocell pre-amplifier 61 and passes through low pass filter 62. The resultant signal may be called measured reflectivity, $R_{measured}$. $R_{measured}$ is presented to sample and store circuit 63 and to gated differential divider 64. Viewer clear signal VC enables sample and store circuit 63 when, as previously described, the frame fill calculation indicates that essentially no product is passing in front of the viewing frame. While viewer clear signal VC is enabling sample and store circuit 63, sample and store circuit 63 produces an average value, B, from the input of measured reflectivity. B is the average background reflectivity at the preselected wavelength in the viewing station when no product is passing in front of the viewing frame. Measured reflectivity, $R_{measured}$, background reflectivity, B, and calculated frame fill, FF, are presented to gated differential divider 64. Gated differential divider 64 is enabled by product detect signal PD so that the gated differential divider performs its calculations when the frame fill exceeds a preset percentage, selected by the operator to assure that a sufficient amount of the product fills the frame to generate a reliable reflectivity measurement. It is also apparent that in this manner no calculation is attempted which would result in attempting to divide by zero.

It can be seen that the output of the gated differential divider will either be 0 or the reflectivity value of the product, $R_P$, calculated as follows:

$$R_P = \frac{R_{measured} - B}{FF} + B$$

$R_P$ is the reflectivity of the product as calculated;
$R_{measured}$ is the dynamically measured reflectivity, at a given wavelength of light, passing through the viewing frame;
B is the averaged background reflectivity for the given wavelength of light with no product in the viewing frame; and
FF is the calculated fraction of the frame that the product fills at the given instant.

FIG. 7 illustrates the signal output over time of gated differential divider 64 as uniform but different colored objects pass in front of the frame. Point 71 in the time scale illustrates when a first product fills the viewing frame to an extent greater than the minimum set frame fill. At that point, the reflectivity output rises immediately to the true reflectivity level of the product, 72. At point in time 73, the signal returns to 0 indicating that the frame fill of the first product has fallen below the minimum preset frame fill value. At a subsequent point in time 74, the frame fill of a second product exceeds the minimum set frame fill value. The signal immediately rises to level 75 indicating the true reflectivity of the second product. At point in time 76 the signal returns to 0 indicating that the second product fills the viewing frame to an extent less than the minimum set frame fill value. Point 77 on the time scale is indicative of a third product filling the viewing frame to an extent greater than the minimum set frame fill. Line 78 is indicative of the reflectivity value of the third product. Reflectivity levels 72, 75 and 78 need not remain constant; a blemish on a product would be indicated by a change in value of line 72, 75 or 78.

FIG. 8 illustrates the possibility of different areas being presented simultaneously to three different viewers by an irregularly shaped product. Whereas the product might fill the viewing frame in the first direction virtually 100%, the product might fill only a fraction of the frames in directions two and three. If the product were uniformly colored, a standard three view system that did not correct for frame fill would measure three different reflectivities. Given the frame fill calculation of the present invention, although there will be different $R_{measured}$'s, i.e., different dynamically detected reflectivities from the perspectives of different viewers, after correction for frame fill each $R_P$, the calculated reflectivity of the product, should be the same. Lines 72, 75, and 78 in FIG. 7 are independent of perspective.

While a particular embodiment of the invention has been shown and described, it will be understood that the invention is not limited thereto, since many modifications may be made and will become apparent to those skilled in the art. It is well understood that the calculations performed herein can be equally well or better performed in the digital domain and the signals required herein can be multiplexed. However, these methods are clearly apparent to those skilled in the art.

What is claimed is:

1. An apparatus for measuring the frame fill of a product passing a viewing frame which comprises:
    means for generating modulated light, so modulated and so directed that when a product passes the viewing frame a change is caused in the modulated light passing through the viewing frame and that change is a function of the location of the product with respect to the frame;

means for detecting the modulated light passing through the viewing frame and for generating a first corresponding modulated electrical signal; and means for calculating frame fill based on changes in the first modulated electrical signal.

2. The apparatus of claim 1 wherein the means for generating modulated light generates pulsed light.

3. The apparatus of claim 1 wherein the means for generating modulated light:
is located opposite the viewing frame such that the product passes between the means for generating modulated light and the viewing frame; and
the modulated light is sufficiently diffused to uniformly illuminate the viewing frame.

4. The apparatus of claim 2 wherein the means for generating modulated light:
is located opposite the viewing frame such that the product passes between the means for generating modulated light and the viewing frame; and
the modulated light is sufficiently diffused to uniformly illuminate the viewing frame.

5. The apparatus of claim 4 which further comprises:
two or more means for generating modulated light, two or more viewing frames, two or more means for detecting the modulated light; and
first timing means controlling the two or more means for generating modulated light so that the means for generating modulated light are pulsed on and off singly, in sequence.

6. The apparatus of claim 5 wherein the two or more means for generating modulated light are off concurrently for a sample time before the timing cycle repeats itself.

7. The apparatus of claim 1 wherein the means for calculating frame fill includes:
means for differencing values of the first modulated electrical signal;
second timing means for enabling said means for differencing values to difference at succeeding times, one time being when the modulation of the modulated light is at one extreme and a second time being when the modulation of the modulated light is at an opposite extreme;
means for detecting and storing a maximum value from a series of differenced values of the first modulated electrical signal; and
means for computing frame fill based on the stored maximum value and an immediate differenced value.

8. An apparatus for measuring the reflectivity of a product passing a viewing frame which comprises:
means for generating modulated light, so modulated and so directed that when a product passes the viewing frame a change is caused in the modulated light passing through the viewing frame and that change is a function of the location of the product with respect to the frame;
means for detecting the modulated light passing through the viewing frame and for generating a first corresponding modulated electrical signal;
means for calculating frame fill based on changes in the first modulated electrical signal;
means for generating light containing the wavelength of product reflectance desired to be measured, the light being so directed that light of such wavelength reflects from the product passing the viewing frame and through the frame;
means for detecting the light in the wavelength of product reflectance desired to be measured that passes through the viewing frame and for generating a second corresponding electrical signal; and
means for calculating the reflectivity of the product based on the second electrical signal and frame fill.

9. The apparatus of claim 8 wherein said means for calculating the reflectivity includes:
means for operator selection of a first minimum level of frame fill to operate as a product-detect signal;
a second preset level of frame fill set below the third operator selected minimum level of frame fill which second preset level indicates viewer-clear status;
a background sampling circuit enabled when frame fill is below the second preset level of frame fill, which circuit when enabled samples, averages and stores the average value of the second electrical signal; and
means for enabling, when frame-fill exceeds the operator selected first minimum level of frame fill, the calculation of product reflectivity based on the immediate value of the second electrical signal, the stored average value of the second electrical signal and frame fill.

10. An apparatus for measuring the reflectivity of a product passing a viewing frame which comprises:
means for generating modulated light containing the wavelength of product reflectance desired to be measured, so modulated and so directed that when a product passes the viewing frame a change is caused in the modulated light passing through the viewing frame, which change is a known function of the location of the product with respect to the frame and the reflectivity of the product;
means for detecting the modulated light passing through the viewing frame and for generating a corresponding modulated electrical signal;
means for calculating frame fill based on changes in the modulated electrical signal; and
means for calculating the reflectivity of the product based on changes in the envelope of the modulated electrical signal and frame fill.

* * * * *